May 10, 1966     H. J. COUCH ETAL     3,250,556
BALL JOINT AND SLEEVE MEANS
Filed Jan. 3, 1962     5 Sheets-Sheet 1
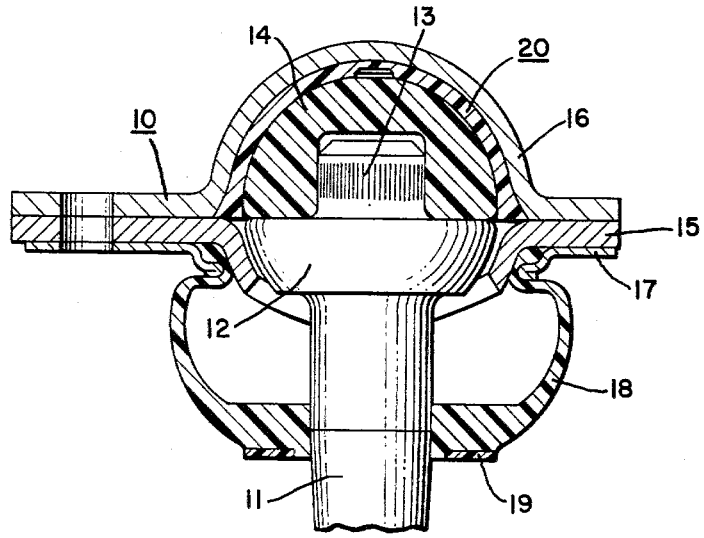
Fig. 1
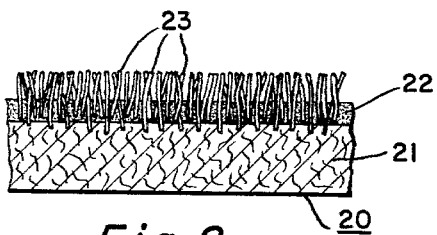
Fig. 2
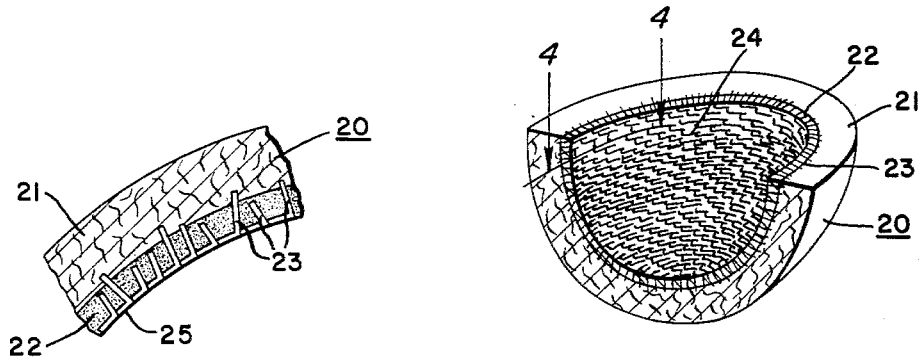
Fig. 4     Fig. 3
INVENTORS
Harry J. Couch
BY Rodger E. Geller
Their Attorney May 10, 1966 H. J. COUCH ETAL 3,250,556
BALL JOINT AND SLEEVE MEANS
Filed Jan. 3, 1962 5 Sheets-Sheet 3

INVENTORS
Harry J. Couch
BY Rodger E. Geller
Their Attorney

INVENTORS
Harry J. Couch
Rodger E. Geller
BY
Their Attorney

May 10, 1966  H. J. COUCH ETAL  3,250,556

BALL JOINT AND SLEEVE MEANS

Filed Jan. 3, 1962  5 Sheets-Sheet 5

INVENTORS
Harry J. Couch
Rodger E. Geller
BY
Their Attorney

United States Patent Office 3,250,556
Patented May 10, 1966

3,250,556
BALL JOINT AND SLEEVE MEANS
Harry J. Couch, Vandalia, and Rodger E. Geller, Dayton, Ohio, assignors to General Motors Corporation, Detroit, Mich., a corporation of Delaware
Filed Jan. 3, 1962, Ser. No. 164,098
1 Claim. (Cl. 287—90)

This invention relates to ball joint and sleeve means and, more particularly, to structural arrangement of self-lubricating material therewith.

An object of this invention is to provide a new and improved structural arrangement for fluorine-containing resin material in a ball joint, bearing sleeve means and the like having a curved contour readily formable to concentrate the resin material radially in a particular location.

Another object of this invention is to provide a structural arrangement for low-friction resin material including Teflon, nylon and Delrin in a ball joint, bearing sleeve means and the like such that ends of individual fibers of the resin material are embedded substantially transversely into a mastic layer on a backing portion formable into a curved shape.

Another object of this invention is to provide electrostatically embedded low-friction resin material flocked as individual fibers interlocked with a mastic means on a backing portion of fibrous material such as felt, paper, woven cotton ducking, elastomer and the like such that the low-friction resin material is held in place at isolated locations regardless of curved contouring into a cylindrical sleeve-like shape or spherical-like shape with a self-lubricating surface engageable by a member complementary thereto.

A further object of this invention is to provide a ball joint and bearing sleeve means with a self-lubricating low-friction surface formed by a perforated sheet of low-friction resin material having multiple substantially equally spaced holes adapted to interlock with resin mastic means flowable into the holes for mechanical interlock on a backing portion to which the mastic means adheres subject to forming a predetermined curved shape.

Another object of this invention is to provide a ball joint and bearing sleeve means having ends of individual fibers of low-friction fluorine-containing resin material such as Teflon embedded in mobile mastic means on fibrous material such as felt, paper, woven cotton ducking and the like such that the mastic means is immobilized and the fibers at exposed ends thereof are subjected to abrasive grinding, etching mechanically or chemically to provide proper predetermined offset thereof above the mastic means curable into a predetermined curved shape.

Further objects and advantages of the present invention will be apparent from the following description, reference being had to the accompanying drawings wherein preferred embodiments of the present invention are clearly shown.

In the drawings:

FIGURE 1 is a cross-sectional elevational view of a ball joint and socket means embodying the present invention.

FIGURE 2 illustrates low-friction filament means sprayed or flocked onto an adhesive mastic resin means applied to backing material.

FIGURE 3 illustrates in perspective a fragment of a spherical bearing surface formed with the material of FIGURE 2 and for use in the ball joint and socket means of FIGURE 1.

FIGURE 4 is a fragmentary sectional view taken along line 4—4 in FIGURE 3.

Figure 5:
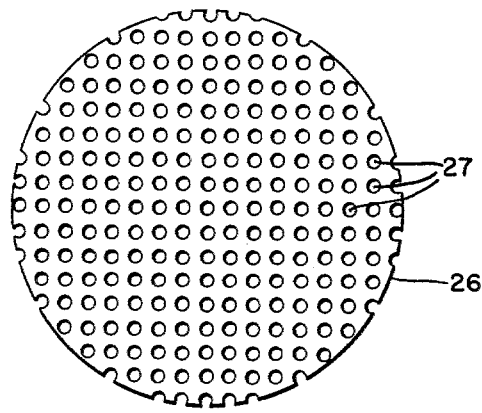
FIGURE 5 is a plan view of a perforated sheet of low-friction bearing material for use in accordance with the present invention.

Motor vehicle manufacturers are striving to minimize and possibly avoid need for lubrication of chassis components including, particularly, ball joint and sleeve means. The present invention relates to specific improvement in structural arrangement of self-lubricating material specifically in ball joint and sleeve means. Accordingly, in FIGURE 1 there is provided a cross-sectional elevational view of a ball joint means generally indicated by numeral 10 including a metal stud 11 integral with a head portion 12 substantially angular in form and terminating in a ribbed end 13 onto which a semi-spherical member 14 can be press-fitted. The spherical member 14 and head portion 12 of the stud 11 form collectively the curved outer surface engageable with a self-lubricating material to be described in further detail. The ball joint means further includes an apertured and embossed base plate 15 which fits complementary to a semi-spherical cover portion 16 to provide space therein for receiving the self-lubricating material as well as the head portion carried by the stud 11. The base and cover portions 15–16 can be welded to each other or can be held together by suitable fastening means such as bolts (not shown) and a retainer means 17 can be provided on one side of the base portion 15. This retainer means 17 can engage an outer periphery of a flange or lip integral with a sealing boot means 18 of elastomeric material having a self-lubricating low-friction bearing surface 19 along one side thereof adapted to slide or engage a member adjacent to the stud 11. This member can be any suspension component and the like.

In the space defined by the complementary base and cover portions 15–16 there is located a self-lubricating preform generally indicated by numeral 20 and shown in further detail in views of FIGURES 2, 3 and 4. The preform 20 includes a backing portion 21 of fibrous material such as felt, woven cotton ducking, paper, or other cellulose material to which an adhesive resin or mastic means 22 is added by spraying or impregnation of the backing portion 21 so as to have a coating or layering of the mastic means on one side thereof. A plurality of fiber-like particles 23 can be sprayed or electrostatically flocked to have one end of each thereof embedded transversely into the mastic means of epoxy or phenolic resin material. Free ends of the fiber-like particles 23 can form a self-lubricating bearing surface 24 as indicated in FIGURE 3 due to bending over of free ends 25 as represented in FIGURE 4. The fiber-like particles 23 can be oriented electrostatically or mechanically into a swirl or in a particular direction either prior to or during molding to cure the preform 20 into a curved shape such as represented in FIGURES 3 and 4. Collectively the free ends 25 of the low-friction plastic material form a bearing surface engageable by the outer periphery of the head portion formed collectively by the head 12 and member 14 of FIGURE 1. The low-friction plastic material can be Teflon, polytetrafluoroethylene or polychlorofluoroethylene as well as acetal resin or Delrin and nylon which is a manufactured fiber in which the fiber-forming substance is any long chain synthetic polyamide having recurring amide groups as an integral part of the polymer chain. The mastic means is initially in a mobile condition as layering of adhesive such as epoxy or phenolic resin is added to the backing portion 21 for bonding thereto. The mastic means 22 is immobilized by spraying or flocking of the fiber-like particles 23 transversely therethrough so as to be anchored and interlocked therewith in accordance with the present invention.

Figure 6:
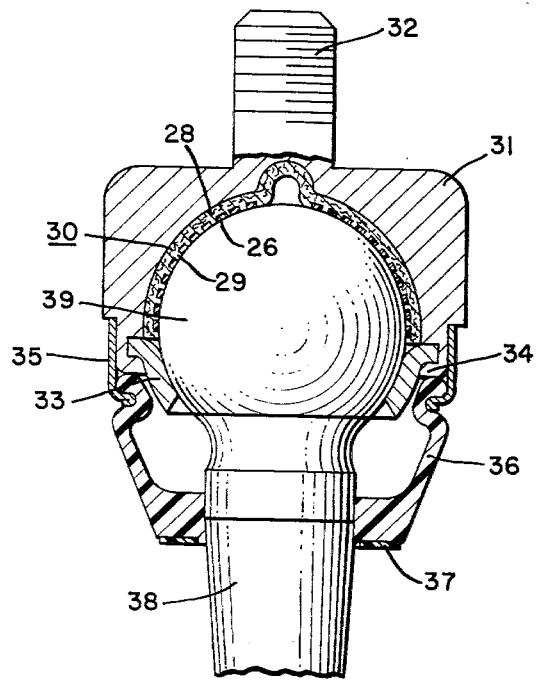
FIGURE 6 is a cross-sectional elevational view of a ball joint and socket means embodying the perforated sheet of FIGURE 5.

FIGURE 5 illustrates a perforated sheet 26 of low-friction bearing material such as Teflon and the like having a plurality of apertures or holes 27 therethrough. This sheet 26 of low-friction bearing material is adapted to become part of a ball joint means as illustrated in FIGURE 6. A backing portion 28 carries a layer of resin 29 that fills the holes 27 to form a preform generally indicated by numeral 30 in FIGURE 6. This preform 30 fits complementary to a socket or housing portion 31 having a mounting stud or bolt portion 32 integral therewith. An angular metal sleeve 33 complements a bearing surface formed by the perforated sheet 26 and this metal sleeve of steel and the like is held in place by peened over edges 34 of the housing portion 31. A retainer means 35 is press fitted onto an outer portion of the housing portion 31 and a flange extending inwardly from the retainer means 35 engages an angular lip integral with an elastomeric sealing boot means 36 having a bearing surface 37 thereon surrounding a stud 38 having a generally spherical head portion 39 journalled relative to the bearing surface formed by the Teflon sheet 26 having the perforations 27 therein. Mastic means or adhesive resin 29 filling the perforations 27 of the perforated sheet 26 can serve to mechanically lock and anchor the perforated sheet 26 in place such that the sheet provides a low-friction bearing surface for the head portion 39 of the stud 38.

Figure 7:
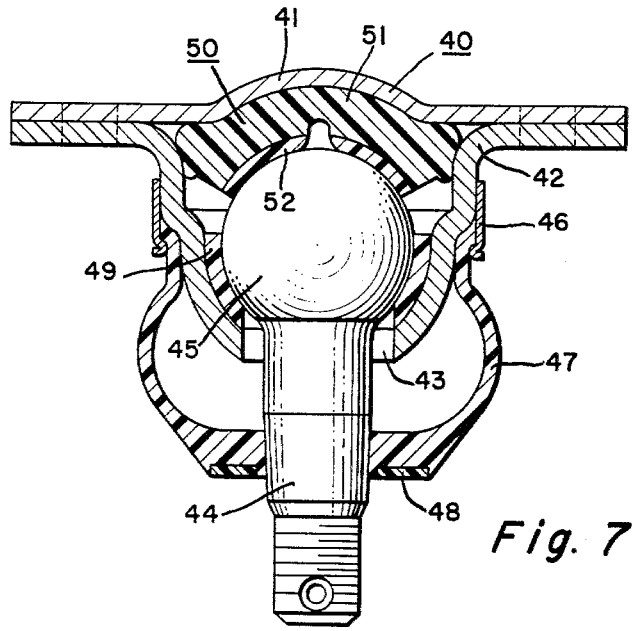
FIGURE 7 is another cross-sectional elevational view of a ball joint and socket means having a low-friction bearing surface structurally arranged in accordance with a further embodiment of the present invention.
Figure 8:
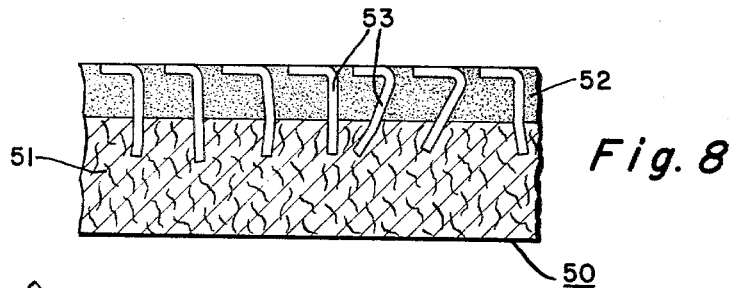
FIGURE 8 illustrates a multi-part preform of fibrous particles embedded into mastic means on a base portion and FIGURE 9 illustrates the same preform subjected to etching mechanically or chemically.
Figure 9:
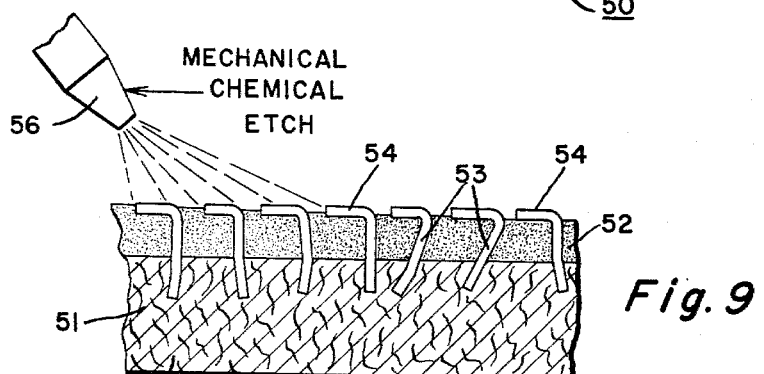

FIGURE 7 illustrates another ball and socket joint means generally indicated by numeral 40 including a cover portion 41 as well as a complementary body portion 42 of a metal housing having an opening 43 therein through which a stud 44 with an integral head portion 45 can fit. The cover and body portions 41–42 can be welded or fastened by a screw (not shown) into assembled relationship so as to define a socket space. An annular retaining means 46 can be press fitted onto an outer periphery of the body portion 42 so as to engage an annular end of a sealing boot means 47 of elastomeric material having a sealing surface 48 adjacent to one end thereof for engaging a vehicle mounting or suspension component. The head portion 45 of the stud 44 can engage an annular bearing portion 49 as well as a preform generally indicated by numeral 50 having structural arrangement further in accordance with the present invention. The preform 50 includes a backing portion 51 of felt, woven cotton ducking, paper as well as other cellulose materials. A layering of adhesive resin or mastic means 52 is added to this backing portion and low-friction fiber-like particles 53 shown in views of FIGURES 8 and 9 are sprayed or flocked transversely through the adhesive resin or mastic means 52 so as to have the mastic means surround the fiber-like particles 53. FIGURE 8 illustrates the multi-part preform 50 used in the ball point means of FIGURE 7 as the low-friction particles of fiber-like Teflon and the like indicated by numeral 53 are totally embedded in the mastic means 52. FIGURE 9 illustrates how the same preform 50 is subjected to etching mechanically by sand blasting and the like or chemically by treatment with a mild alkaline solution to expose bent-over ends 54 of the low-friction material fiber-like particles 53 which collectively form a bearing surface engageable by the ball portion 45 of the study 44. Chemical etching can be accomplished by using a lye soap-type solution as well as a weak sodium hydroxide solution and the like. Also, it is possible to use an acidic solution which will remove some of the mastic means without deteriorating the low-friction particles 53 having the ends 54 to be exposed. A suitable nozzle means 56 indicated in FIGURE 9 can be used for mechanical or chemical etching.

Figure 10:
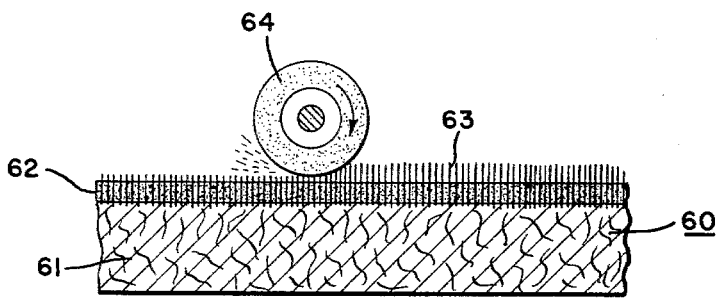
FIGURE 10 shows a machining-off of ends of low-friction fibers embedded in a mastic means on a backing portion so as to leave isolated cross-section areas of burr-like ends thereof as a self-lubricating bearing means.

FIGURE 10 illustrates a multi-part preform generally indicated by numeral 60 including a backing portion 61 of materials similar to those for the preform 50 used in the ball joint means of FIGURE 7 as well as a mastic means or adhesive resinous layer 62 initially mobile and immobilized by flocking or spraying a plurality of individual fiber-like particles 63 thereto subject to cutting or abrading thereof such as by a grinder or wheel 64 so as to leave a burr-like stubble with free ends of the particles 63 isolated and separated from each other by the mastic means 62 in which opposite ends of the particles are embedded. The particles 63 can be provided as a self-lubricating bearing surface and free ends of the particles 63 will extend radially inwardly toward the head portion 45 of the stud 44 in the ball joint means of FIGURE 7.

Figure 11:
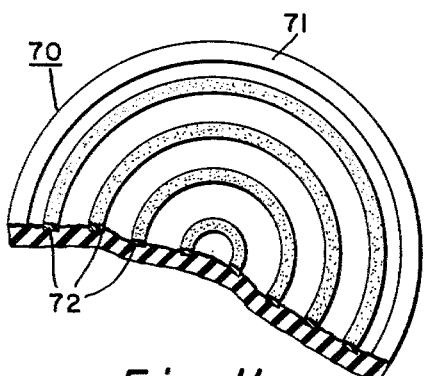
FIGURE 11 is a partially sectioned plan view of a curved multi-part preform of backing material and concentric ring portions of low-friction bearing material also in accordance with the present invention.

FIGURE 11 illustrates another preform generally indicated by numeral 70 including an elastomeric backing portion 71 which is semi-spherical in molded shape and which includes a plurality of concentric ring portions 72 of low-friction material such as Teflon and the like. Such ring portions can be punched or stamped with a suitable die from a sheet of material and alternate use of ring portions for different ball joint means will permit mechanical locking thereof by molding of elastomeric material laterally therebetween for anchoring the ring portions in place.

Figure 12:
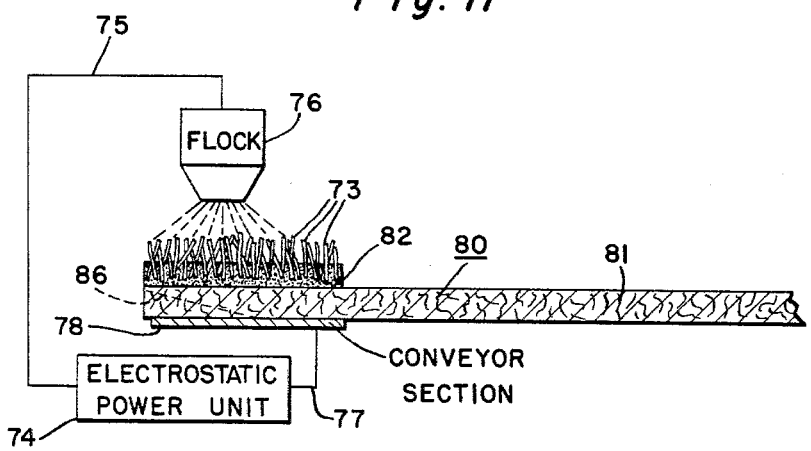
FIGURE 12 illustrates flocking procedure for making another preform in accordance with the present invention.
Figure 13:
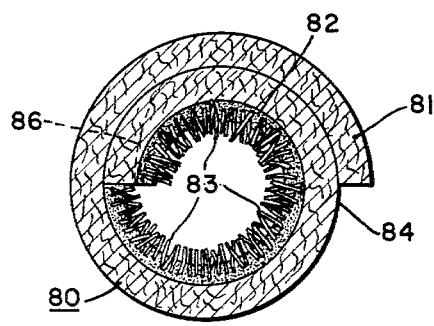
FIGURE 13 illustrates a step of spirally wrapping the preform of FIGURE 12.
Figure 14:
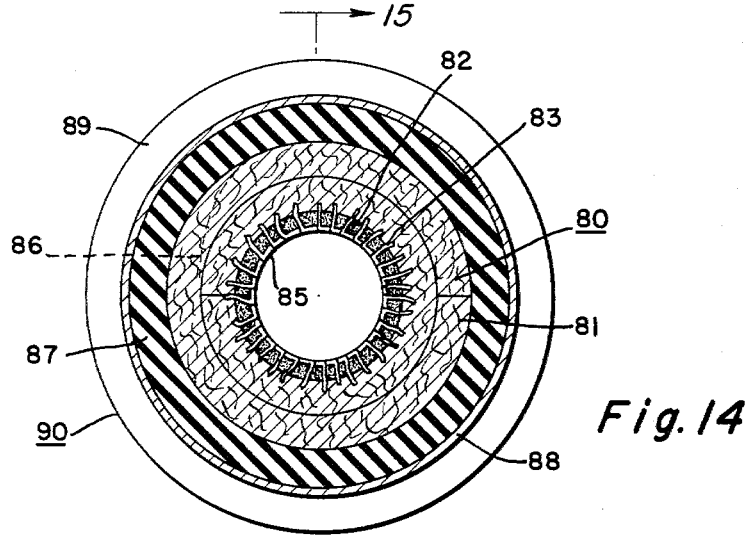
FIGURE 14 illustrates a cylindrical bearing surface made with the preform of FIGURES 12 and 13 for use in a sleeve bearing means in accordance with the present invention.
Figure 15:
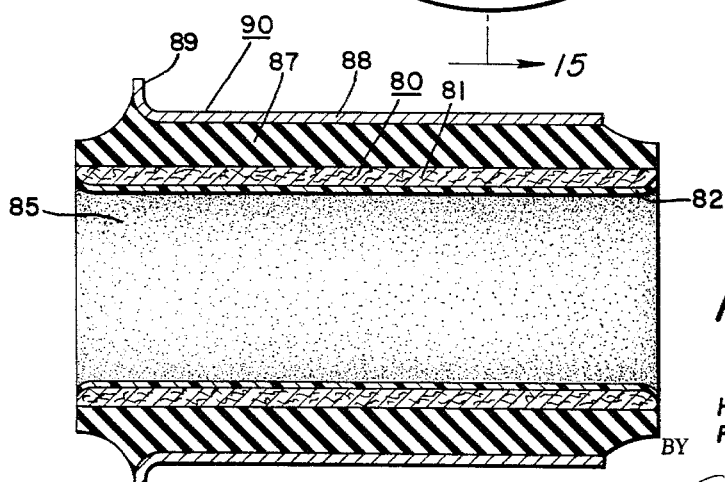
FIGURE 15 is a cross-sectional view taken along line 15—15 in FIGURE 14.

FIGURE 12 illustrates flocking procedure for making another preform in accordance with the present invention. An electrostatic power unit 74 has a connection 75 to an emitter means 76 for spraying and flocking fiber-like particles in accordance with the present invention. The electrostatic power unit 74 also has a connection 77 to a conveyor section 78 on which a multi-part preform generally indicated by numeral 80 can be moved such that a predetermined width of a backing portion 81 has a mastic means or adhesive epoxy or phenolic resin 82 added thereto subject to transverse embedding of individual fiber-like particles 73 therein. FIGURE 13 illustrates a step of spirally wrapping the preform into a convolute shape 84 prior to cylindrical molding thereof to provide a cylindrical bearing surface 85 as indicated in FIGURE 14. It is to be noted that an optional undercut or recess 86 can be provided in the backing portion 81 adjacent to one end thereof where the mastic means 82 is added so as to facilitate spiral wrapping thereof for assembly and molding with an elastomeric angular rubber portion 87 concentrically thereon. The rubber portion of elastomeric material 87 bonds the preform 80 to a metal sleeve 88 having an outwardly extending flange 89. Joining of the preform 80 with the elastomeric section 87 and metal sleeve 88 with flange 89 forms a sleeve means generally indicated by numeral 90 having a multi-part preform with a low-friction bearing surface 85 in accordance with the present invention. Views of FIGURES 14 and 15 illustrate the sleeve means 90. It is to be noted that free ends of the low-friction particles 83 can be oriented circularly or longitudinally relative to the sleeve means 90 and this orientation can occur mechanically or electrostatically before or during the molding operation.

It is to be noted that the low-friction fiber-like particles can be added to mastic means for use as a bearing surface either inside or outside the cylindrical sleeve. Also, it is to be noted that a dry powder mixture of vegetable fiber materials such as sisal and cotton can be coated with a resin material such as epoxy or phenolic to make the mixture tacky subject to electrostatic deposition of low-friction fiber-like particles such as Teflon in accordance with the present invention. Individual Teflon fibers can have a length as great as three-sixteenths of an inch. Also, nylon flocking material can be used with the adhesive or mastic means and such nylon flocking can have individual lengths of .030 inch. The adhesive or mastic means can be sprayed or rolled into place on the backing portion and the hair-like low-friction plastic particles of material such as Teflon can be electrostatically caused to stand up and can form isolated areas of low-friction material. For the embodiments of FIGURES 5 and 6 the low-friction material is perforated so that adhesive resin means can ooze or flow into the apertures therethrough and thus mechanically interlock and anchor the low-friction material relative to the backing portion. It is to be noted further that powder-like low-friction material can be dusted or sprayed onto a surface for some applications and that such powder will then cold flow and penetrate the backing or base portion. Also, it is possible to mix dry resin powder with felt, fiber and the like compounded into a slurry or paste subject to molding to a predetermined shape and having the low-friction particles embedded therein.

While the embodiments of the present invention as herein disclosed constitute preferred forms, it is to be understood that other forms might be adopted.

What is claimed is as follows:

A ball joint assembly, comprising, an elongated stud terminating in a curved substantially spherical head portion, a socket means including a threaded mounting stud and a substantially spherical recess portion receiving said spherical head portion, a bearing element seated in said socket spherical recess portion including a fabric backing portion of bondable material having a layer of an initially mobile and curable resin exemplified by epoxy, phenolic and the like bonded directly on one side of said backing portion and a substantially semispherical perforated sheet of low-friction plastic material that consists of one from a group of Teflon, nylon and Delrin, the entire semispherical perforated sheet having evenly spaced apertures therethrough with the apertures thereof receiving said curable resin in complementary interfitting relationship, said semispherical perforated sheet of low friction material engaging said curved substantially spherical head portion thereby permitting movement of said substantially spherical head, said socket means including a recessed shoulder adjacent the annular end of said bearing element and a blind recess at the bottom of said socket spherical recess portion receiving an integral projecting portion of said bearing element, and an annular retainer means abutting said socket shoulder and secured thereto by a shoulder lip portion, said annular retainer means extending radially inwardly toward the spherical head portion a distance so as to abut the annular end of said bearing element and also having a spherical surface complementary to the stud spherical head portion and contiguous with the bearing surface of the bearing element, thereby providing a spherical surface continuation from the bearing surface of said bearing element.

References Cited by the Examiner
UNITED STATES PATENTS

| 299,109 | 5/1884 | Brigham | 308—238 |
|---|---|---|---|
| 1,274,323 | 7/1918 | Poetschke. | |
| 2,840,881 | 7/1958 | Bateman. | |
| 2,890,041 | 6/1959 | Runton et al. | 308—238 X |
| 2,908,028 | 10/1959 | Runton et al. | |
| 2,933,309 | 4/1960 | Heiss | 287—87 X |
| 2,974,975 | 3/1961 | Thomas | 287—80 X |
| 2,998,397 | 8/1961 | Riesing | 308—238 X |
| 3,011,219 | 12/1961 | Williams. | |
| 3,033,623 | 5/1962 | Thomson. | |
| 3,059,318 | 10/1962 | Herbert et al. | |
| 3,059,951 | 10/1962 | Thomas. | |

CARL W. TOMLIN, *Primary Examiner.*

DONALD R. SCHRAN, *Examiner.*

A. V. KUNDRAT, *Assistant Examiner.*